(12) United States Patent
Washiro

(10) Patent No.: US 10,523,051 B2
(45) Date of Patent: Dec. 31, 2019

(54) POWER FEEDING UNIT, POWER RECEIVING UNIT, AND FEED SYSTEM

(71) Applicant: Sony Corporation, Tokyo (JP)

(72) Inventor: Takanori Washiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/278,967

(22) Filed: Sep. 28, 2016

(65) Prior Publication Data

US 2017/0018964 A1   Jan. 19, 2017

Related U.S. Application Data

(63) Continuation of application No. 14/465,155, filed on Aug. 21, 2014, now Pat. No. 9,473,206.

(30) Foreign Application Priority Data

Oct. 9, 2013  (JP) .................................. 2013-211935

(51) Int. Cl.
*H02J 50/10* (2016.01)
*H04B 5/00* (2006.01)
*H02J 50/80* (2016.01)
*H02J 7/02* (2016.01)

(52) U.S. Cl.
CPC .............. *H02J 50/10* (2016.02); *H02J 7/025* (2013.01); *H02J 50/80* (2016.02); *H04B 5/0012* (2013.01); *H04B 5/0031* (2013.01); *H04B 5/0037* (2013.01)

(58) Field of Classification Search
CPC ...... H02J 5/005; H04B 5/0012; H04B 5/0037

USPC .............................. 307/104; 439/39; 335/290
See application file for complete search history.

(56) References Cited

U.S. PATENT DOCUMENTS

| | | | |
|---|---|---|---|
| 6,177,790 B1 | 1/2001 | Emberty et al. | |
| 2007/0173287 A1* | 7/2007 | Henson | H04M 1/677 |
| | | | 455/557 |
| 2009/0243397 A1 | 10/2009 | Cook et al. | |
| 2010/0290542 A1* | 11/2010 | Peabody | E05B 17/22 |
| | | | 375/258 |
| 2010/0295506 A1 | 11/2010 | Ichikawa | |
| 2011/0115303 A1 | 5/2011 | Baarman et al. | |
| 2011/0143556 A1 | 6/2011 | Hsu | |
| 2011/0181239 A1* | 7/2011 | Kadoyama | H02J 7/025 |
| | | | 320/108 |
| 2012/0049642 A1 | 3/2012 | Kim et al. | |
| 2013/0127256 A1 | 5/2013 | Kim et al. | |
| 2013/0285442 A1* | 10/2013 | Bauer | H02J 5/005 |
| | | | 307/9.1 |

FOREIGN PATENT DOCUMENTS

| | | |
|---|---|---|
| JP | 2012-213322 | 11/2012 |
| JP | 2013-009235 | 1/2013 |

* cited by examiner

*Primary Examiner* — Alfonso Perez Borroto
(74) *Attorney, Agent, or Firm* — Michael Best & Friedrich LLP

(57) ABSTRACT

A power feeding unit includes: a power feeding electrode configured to be coupled through an electric field with a power receiving electrode of a power receiving unit; a power feeding section configured to feed the power receiving unit with power through the power feeding electrode; and a power feeding side communication section configured to communicate with the power receiving unit through the power feeding electrode.

21 Claims, 5 Drawing Sheets

POWER FEEDING UNIT, POWER RECEIVING UNIT, AND FEED SYSTEM

CROSS REFERENCE TO RELATED APPLICATIONS

This application is a Continuation application of patent application Ser. No. 14/465,155, filed Aug. 21, 2014, which claims the benefit of Japanese Priority Patent Application No.: 2013-211935 filed Oct. 9, 2013, the entire contents of which are incorporated herein by reference.

BACKGROUND

The present disclosure relates to a power feeding unit, a power receiving unit, and a feed system that wirelessly supply power.

In recent years, a feed system performing wireless power feeding (also called wireless power transfer, contact free, or non-contact power feeding) on consumer electronics devices (CE devices) such as mobile phones and portable music players has attracted attention. In such a feed system, for example, a mobile phone (a power receiving unit) may be charged when the mobile phone is placed on a feeding tray (a power feeding unit). In other words, in such a feed system, the power feeding is allowed to be performed without connecting the power feeding unit and the power receiving unit by a cable or the like. Examples of the method of performing such wireless power feeding may include, for example, a magnetic field coupling method such as an electromagnetic induction method, an electric field coupling method, and an electromagnetic wave transmission method. Among them, the electric field coupling method is advantageously less in heat generation, less in leakage of electromagnetic field, and capable of reducing a thickness of a device.

In such a feed system, typically, for example, power transmission efficiency and the like are varied depending on arrangement position of the power receiving unit on a feeding surface of the power feeding unit at the time of power feeding. Specifically, a desirable range of the arrangement position of the power receiving unit exists on the feeding surface of the power feeding unit. For example, in Japanese Unexamined Patent Application Publication No. 2012-213322, an electric field coupling feed system in which a magnet is provided on each of a power feeding unit and a power receiving unit, and these magnets attract to each other to perform positioning is disclosed. In the feed system, for example, the power feeding unit is provided with a magnetic sensor, the power receiving unit is authenticated by determining whether a magnetic flux density exceeds a predetermined magnetic flux density, and the feeding operation is controlled based on the authentication result.

Incidentally, there is a feed system capable of performing wireless communication between the power feeding unit and the power receiving unit in addition to wireless power feeding. For example, in Japanese Unexamined Patent Application Publication No. 2013-9235, a communication unit that has a coil for wireless power feeding and an electrode for wires communication, and is capable of performing power feeding and data transfer without cable at a time is disclosed.

SUMMARY

Incidentally, a feed system performing wireless power feeding desirably performs power feeding safely, and is expected to be improved in safety.

It is desirable to provide a power feeding unit, a power receiving unit, and a feed system that are capable of performing power feeding safely.

According to an embodiment of the disclosure, there is provided a power feeding unit including: a power feeding electrode configured to be coupled through an electric field with a power receiving electrode of a power receiving unit; a power feeding section configured to feed the power receiving unit with power through the power feeding electrode; and a power feeding side communication section configured to communicate with the power receiving unit through the power feeding electrode.

According to an embodiment of the disclosure, there is provided a power receiving unit including: a power receiving electrode configured to be coupled through an electric field with a power feeding electrode of a power feeding unit; a power receiving section configured to receive power from the power feeding unit through the power receiving electrode; and a power receiving side communication section configured to communicate with the power feeding unit through the power receiving electrode.

According to an embodiment of the disclosure, there is provided a feed system including: a power feeding unit; and a power receiving unit. The power feeding unit includes a power feeding electrode, a power feeding section configured to feed the power receiving unit with power through the power feeding electrode, and a power feeding side communication section configured to communicate with the power receiving unit through the power feeding electrode. The power receiving unit includes a power receiving electrode configured to be coupled through an electric field with the power feeding electrode, a power receiving section configured to receive power from the power feeding unit through the power receiving electrode, and a power receiving side communication section configured to communicate with the power feeding unit through the power receiving electrode.

In the power feeding unit and the feed system according to the respective embodiments of the disclosure, the power feeding section feeds the power receiving unit with power, and communication is performed between the power feeding side communication section and the power receiving unit. At this time, the power feeding and the communication are performed through the power feeding electrode.

In the power receiving unit and the feed system according to the respective embodiments of the disclosure, the power feeding unit feeds the power receiving section with power, and communication is performed between the power feeding unit and the power receiving side communication section. At this time, the power feeding and the communication are performed through the power receiving electrode.

According to the power feeding unit, the power receiving unit, and the feed system according to the respective embodiments of the disclosure, the power feeding and the communication are performed through the power feeding electrode and the power receiving electrode. Therefore, it is possible to perform the power feeding safely. Note that effects described here are not limitative, and may include any of effects that will be described in the present specification.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION

Hereinafter, preferred embodiments of the disclosure will be described in detail with reference to drawings.

Embodiment

Configuration Example

Figure 1:
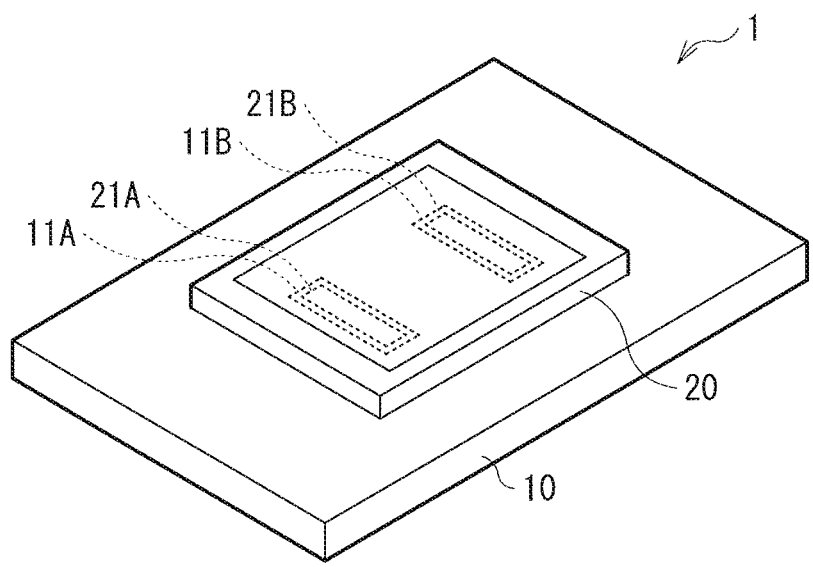
FIG. 1 is a perspective view illustrating a configuration example of a feed system according to an embodiment of the disclosure.

FIG. 1 illustrates a configuration example of a feed system according to an embodiment. A feed system 1 is a feed system wirelessly supplying power. Note that a power feeding unit and a power receiving unit according to respective embodiments of the disclosure are embodied by the present embodiment, and thus are described together.

The feed system 1 includes a power feeding unit 10 and a mobile phone 20 (a smartphone in this example). The power feeding unit 10 is a tray-type unit, and when the mobile phone 20 is placed on the power feeding unit 10, the power feeding unit 10 feeds a power receiving unit 30 (described later) incorporated in the mobile phone 20 with power. Two power feeding electrodes 11A and 11B (described later) are disposed on an upper surface (on a side in contact with the mobile phone 20) of the power feeding unit 10, and two power receiving electrodes 21A and 21B (described later) are disposed on a lower surface (on a side in contact with the power feeding unit 10) of the mobile phone 20. The power feeding unit 10 uses these electrodes to feed power to the mobile phone 20 through electric field coupling.

Incidentally, although the power receiving unit 30 is incorporated in the mobile phone 20 in this example, the configuration is not limited thereto. For example, the power receiving unit 30 may be incorporated in various portable terminal apparatuses such as a digital camera, a video camera, and a mobile battery.

Figure 2:
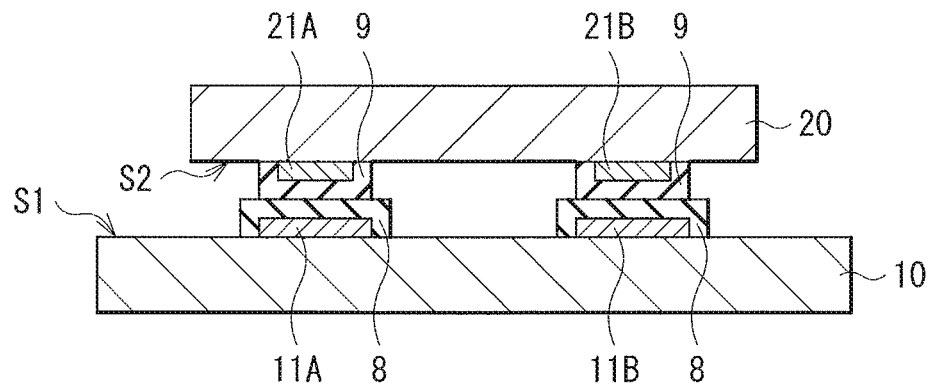
FIG. 2 is a sectional diagram illustrating a schematic cross-sectional configuration of the feed system illustrated in FIG. 1.

FIG. 2 is a schematic sectional diagram of the power feeding unit 10 and the mobile phone 20. This example illustrates a state where the mobile phone 20 is placed on the power feeding unit 10 and feeding operation is performed.

The power feeding unit 10 has the two power feeding electrodes 11A and 11B. The power feeding electrodes 11A and 11B are disposed on a surface (a feeding surface S1) in contact with the mobile phone 20. The power feeding electrodes 11A and 11B are each covered with an insulating material 8. As a result, the power feeding electrodes 11A and 11B are coupled through an electric field with the power receiving electrodes 21A and 21B of the mobile phone 20, respectively, through the insulating material 8 and the like.

The mobile phone 20 has the two power receiving electrodes 21A and 21B. The power receiving electrodes 21A and 21B are disposed on a surface (a power receiving surface S2) in contact with the power feeding unit 10. The power receiving electrode 21A is disposed at a position corresponding to the power feeding electrode 11A of the power feeding unit 10, and the power receiving electrode 21B is disposed at a position corresponding to the power feeding electrode 11B of the power feeding unit 10. The power receiving electrodes 21A and 21B are each covered with an insulating material 9. As a result, the power receiving electrodes 21A and 21B are coupled through an electric field with the power feeding electrodes 11A and 11B of the power feeding unit 10, respectively, through the insulating material 9.

In this example, as illustrated in FIGS. 1 and 2, an area of the power receiving electrode 21A is smaller than an area of the power feeding electrode 11A. Likewise, an area of the power receiving electrode 21B is smaller than an area of the power feeding electrode 11B. Accordingly, when a user puts the mobile phone 20 on the power feeding unit 10, if the power receiving electrodes 21A and 21B are slightly deviated from the center of the power feeding electrodes 11A and 11B, respectively, the power receiving electrode 21A and the power feeding electrode 11A are allowed to easily face to each other with wide area, and the power receiving electrode 21B and the power feeding electrode 11B are allowed to easily face to each other with wide area. Incidentally, this is not limitative, and alternatively, for example, the area of the power receiving electrode 21A is made larger than that of the power feeding electrode 11A, and the area of the power receiving electrode 21B is made larger than that of the power feeding electrode 11B. Moreover, for example, the area of the power receiving electrode 21A may be made equivalent to that of the power feeding electrode 11A, and the area of the power receiving electrode 21B may be made equivalent to that of the power feeding electrode 11B.

Figure 3:
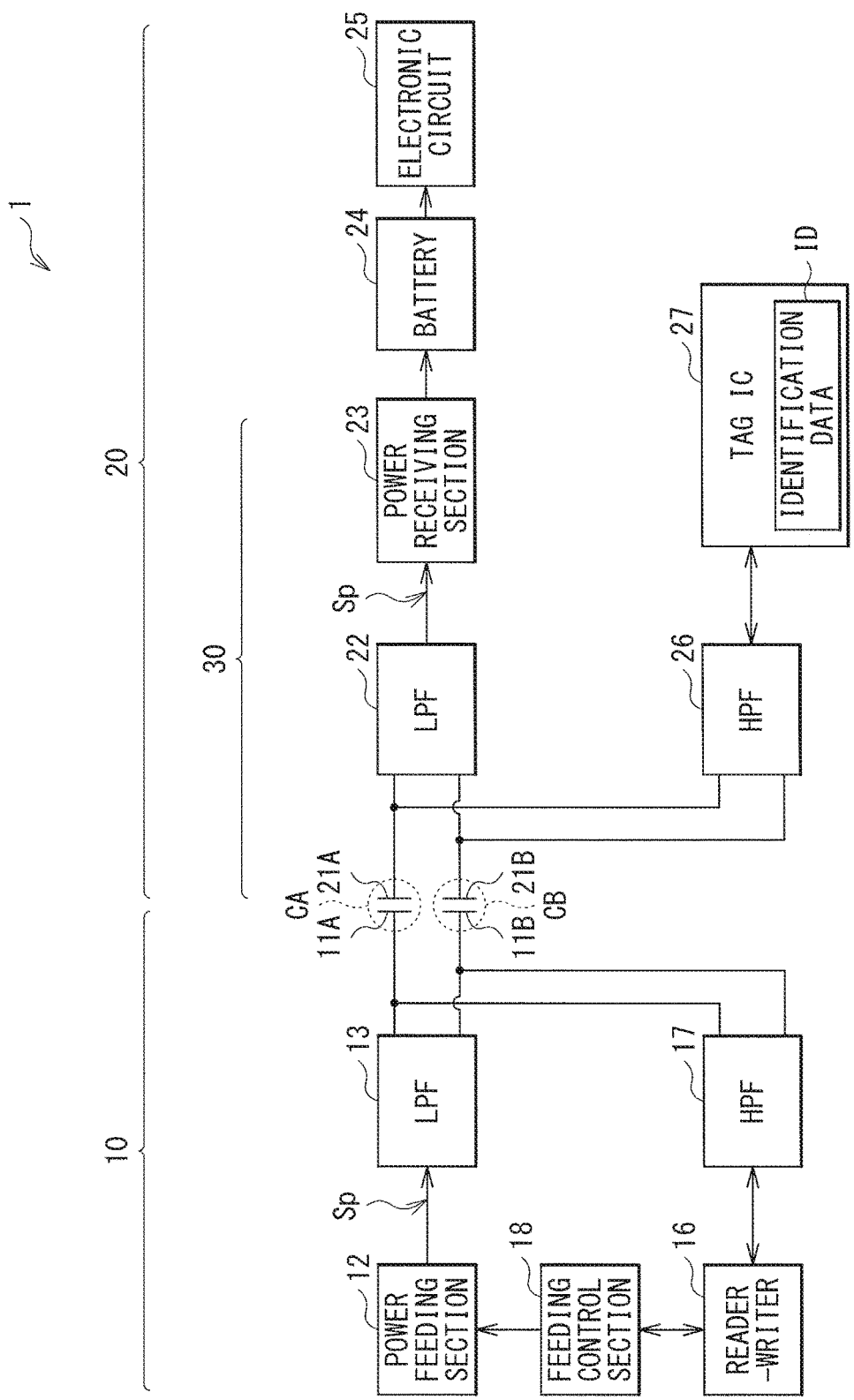
FIG. 3 is a block diagram illustrating a configuration example of a power feeding unit and a mobile phone illustrated in FIG. 1.

FIG. 3 illustrates a configuration example of the feed system 1. This example illustrates a state where the power feeding unit 10 feeds the mobile phone 20 with power. In other words, as illustrated in FIG. 2, when the mobile phone 20 is placed on the feeding surface S1 of the power feeding unit 10, the power feeding electrode 11A is coupled through an electric field with the power receiving electrode 21A, and the power feeding electrode 11B is coupled through an electric field with the power receiving electrode 21B. In FIG. 3, the power feeding electrode 11A and the power receiving electrode 21A are illustrated as a capacitor CA, and the power feeding electrode 11B and the power receiving electrode 21B are illustrated as a capacitor CB.

The power feeding unit 10 includes a power feeding section 12, a low pass filter (LPF) 13, a reader-writer 16, a high pass filter (HPF) 17, and a feeding control section 18. The mobile phone 20 includes the power receiving unit 30, a battery 24, and an electronic circuit 25. The power receiving unit 30 includes a LPF 22, a power receiving section 23, a HPF 26, and a tag IC 27.

The power feeding section 12 generates an AC power signal Sp based on an instruction from the feeding control section 18, and supplies the power signal Sp to the LPF 13. For example, the power signal Sp may be a signal having a frequency of about 100 kHz. Power transmission efficiency at the time of power feeding is allowed to be increased by generating the signal having such a frequency. In addition, as will be described later, amplitude of the power signal Sp is set so that a feedable distance between the power feeding unit 10 and the power receiving unit 30 (the mobile phone 20) and a communicable distance between the power feeding unit 10 and the power receiving unit 30 (the mobile phone 20) are substantially the same as each other.

The LPF 13 is a low pass filter, and is interposed between the power feeding section 12 and the power feeding electrodes 11A and 11B. A cutoff frequency of the LPF 13 is set to allow the power signal Sp to pass through the LPF 13 at the time when the power feeding section 12 feeds the power receiving section 23 of the power receiving unit 30 with power as will be described later, and is set to allow a communication signal not to pass through the LPF 13 at the time when communication is performed between the reader-writer 16 and the tag IC 27 as will be described later.

The reader-writer 16 communicates with the power receiving unit 30 based on the instruction from the feeding control section 18. Specifically, the reader-writer 16 transmits data to the tag IC 27 of the power receiving unit 30, or receives data (such as identification data ID described later) from the tag IC 27. As the reader-writer 16, for example, a reader-writer used for short-range wireless communication standardized by international standard ISO/IEC18092 may be used. This standard may be used in, for example, FeliCa (registered trademark). The reader-writer 16 is allowed to communicate with the tag IC 27 with use of a carrier wave of 13.56 MHz.

In the communication between the reader-writer 16 and the tag IC 27, when the reader-writer 16 transmits data to the tag IC 27, the read-writer 16 transmits transmission data to the tag IC 27. On the other hand, when the reader-writer 16 receives data from the tag IC 27, communication is performed through so-called load modulation. Specifically, first, the reader-writer 16 transmits a predetermined alternating signal to the tag IC 27. Then, the tag IC 27 modulates the load according to the transmission data to be transmitted by the tag IC 27 at the time of receiving the alternating signal. As a result, amplitude and a phase of the alternating signal generated by the reader-writer 16 are changed. The reader-writer 16 is allowed to detect the load modulation by the tag IC 27 by detecting the change of the amplitude and the phase of the alternating signal. In this way, the reader-writer 16 receives the transmission data from the tag IC 27.

Incidentally, the reader-writer used for short-range wireless communication standardized by international standard ISO/IEC18092 is used in this example. However, the reader-writer is not limited thereto, and alternatively, various reader-writer in which a frequency band used for communication is not overlapped with a frequency of the power signal Sp may be used.

The HPF 17 is a high pass filter, and is interposed between the reader-writer 16 and the power feeding electrodes 11A and 11B. A cutoff frequency of the HPF 17 is set to allow the communication signal to pass through the HPF 17 at the time when the communication is performed between the reader-writer 16 and the tag IC 27, and is set to allow the power signal Sp not to pass through the HPF 17 at the time when the power feeding section 12 feeds the power receiving section 23 with power. Incidentally, the HPF is not limited thereto, and a band pass filter may be used in place of the HPF 17.

The feeding control section 18 instructs the reader-writer 16 to perform communication operation, and controls operation of the power feeding section 12 based on the data that is received by the reader-writer 16 from the tag IC 27.

The LPF 22 is a low pass filter, and is interposed between the power receiving electrodes 21A and 21B and the power receiving section 23. A cutoff frequency of the LPF 22 is set to allow the power signal Sp to pass through the LPF 22 at the time when the power feeding section feeds the power receiving section 23 with power, and is set to allow the communication signal not to pass through the LPF 22 at the time when the communication is performed between the reader-writer 16 and the tag IC 27.

The power receiving section 23 receives the AC power signal Sp that is supplied from the power feeding section 12 of the power feeding unit 10 through the LPF 13, the power feeding electrodes 11A and 11B, the power receiving electrodes 21A and 21B, and the LPF 22, and generates a DC signal used for charging the battery 24 based on the power signal Sp. For example, the power receiving section 23 may be configured to include a rectification circuit rectifying the AC power signal Sp, a filter circuit smoothing an output signal of the rectification circuit, a regulator generating a stable DC signal of predetermined voltage used for charging the battery 24 based on an output signal of the filter circuit, and the like.

The battery 24 stores therein power based on the DC signal supplied from the power receiving section 23, and for example, may be configured using a rechargeable battery (a secondary battery) such as a lithium ion battery.

The electronic circuit 25 performs operation to achieve the function of the mobile phone 20. The electronic circuit 25 is configured to include various kinds of devices, for example, a display device such as a liquid crystal display section, a user interface such as a touch panel, a microphone, a speaker, and the like, in addition to an electronic circuit configured of an integration circuit, an individual component, or the like.

The HPF 26 is a high pass filter, and is interposed between the power receiving electrodes 21A and 21B and the tag IC 27. A cutoff frequency of the HPF 26 is set to allow the communication signal to pass through the HPF 26 at the time when the communication is performed between the reader-writer 16 and the tag IC 27, and is set to allow the power signal Sp not to pass through the HPF 26 at the time when the power feeding section 12 feeds the power receiving section 23 with power. Incidentally, the HPF 26 is not limited thereto, and a band pass filter may be used in place of the HPF 26.

The tag IC 27 is recorded with the identification data ID. In addition, the tag IC 27 has a function of communicating with the reader-writer 16 of the power feeding unit 10 through the HPF 17, the power feeding electrodes 11A and 11B, the power receiving electrodes 21A and 21B, and the HPF 26, and is allowed to transmit the identification data ID to the reader-writer 16. For example, a communication function used for short-range wireless communication standardized by international standard ISO/IEC 18092 may be applied as the communication function of the tag IC 27. When the tag IC 27 transmits the data to the reader-writer 16, the communication is performed through the so-called load modulation as described above.

With this configuration, in the feed system 1, the power feeding section 12 feeds the power receiving section 23 with power by supplying the power signal Sp to the power receiving section 23 through the LPF 13, the power feeding electrodes 11A and 11B, the power receiving electrodes 21A and 21B, and the LPF 22. The reader-writer 16 and the tag IC 27 perform the communication through the HPF 17, the power feeding electrodes 11A and 11B, the power receiving electrodes 21A and 21B, and the HPF 26.

When the reader-writer 16 and the tag IC 27 perform the communication, in the case where the power feeding section 12 feeds the power receiving section 23 with power, the signal transmitted between the power feeding unit 10 and the power receiving unit 30 is the power signal Sp superimposed with the communication signal (a superimposed signal). In this case, in the feeding operation, the LPF 22 of the power receiving unit 30 extracts the power signal Sp from the superimposed signal, and supplies the power signal Sp to the power receiving section 23. In addition, in the communication operation, in the communication from the reader-writer 16 to the tag IC 27, the HPF 26 of the power receiving unit 30 extracts the communication signal from the superimposed signal, and supplies the extracted communication signal to the tag IC 27. In the communication from the tag IC 27 to the reader-writer 16, the HPF 17 of the power feeding unit 10 extracts the communication signal from the superimposed signal, and supplies the extracted communication signal to the reader-writer 16.

Here, the power feeding section 12 and the feeding control section 18 correspond to a specific example of "power feeding section" in the disclosure. The reader-writer 16 corresponds to a specific example of "power feeding side communication section" in the disclosure. The tag IC corresponds to a specific example of "power receiving side communication section" in the disclosure.

(Operation and Function)

Subsequently, operation and function of the feed system 1 according to the present embodiment will be described.

(General Operation Outline)

First, with reference to FIGS. 1 to 3, general operation outline of the feed system 1 is described. In the feeding operation, the power feeding section 12 generates the AC power signal Sp based on the instruction from the feeding control section 18, and supplies the power signal Sp to the power receiving section 23 through the LPF 13, the power feeding electrodes 11A and 11B, the power receiving electrodes 21A and 21B, and the LPF 22. The LPF 13 allows the power signal Sp to pass therethrough and blocks the communication signal. The LPF 22 allows the power signal Sp to pass therethrough and blocks the communication signal. The power receiving section 23 generates the DC signal used for charging the battery 24 based on the power signal Sp. The buttery 24 stores therein the power based on the DC signal supplied from the power receiving section 23. The electronic circuit 25 performs operation to achieve the function of the mobile phone 20.

In the communication operation, the reader-writer 16 communicates with the tag IC 27 through the HPF 17, the power feeding electrodes 11A and 11B, the power receiving electrodes 21A and 21B, the HPF 26, based on the instruction from the feeding control section 18. The HPF 17 allows the communication signal to pass therethrough and blocks the power signal Sp. The HPF 26 allows the communication signal to pass therethrough and blocks the power signal Sp. The tag IC 27 communicates with the reader-writer 16.

(Detailed Operation)

Figure 4:
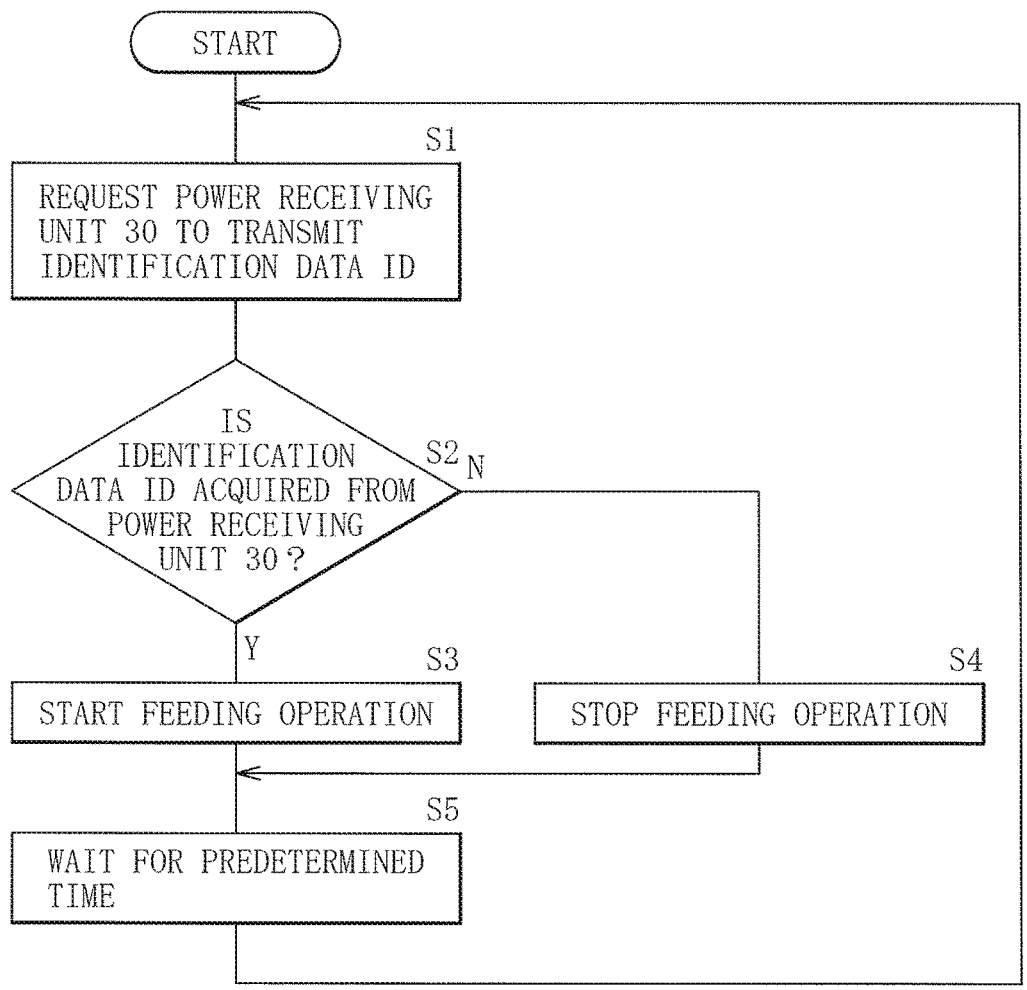
FIG. 4 is a flowchart illustrating an operation example of the power feeding unit illustrated in FIG. 1.

FIG. 4 is a flowchart illustrating operation example of the power feeding unit 10. The power feeding unit 10 performs polling on the power receiving unit 30 (the mobile phone 20), and controls the feeding operation depending on response from the power receiving unit 30. The detail thereof is described below.

First, the power feeding unit 10 communicates with the power receiving unit 30 to request the power receiving unit 30 to transmit the identification data ID (step S1). Specifically, the reader-writer 16 of the power feeding unit 10 communicates with the tag IC 27 of the power receiving unit 30 through the power feeding electrodes 11A and 11B, the power receiving electrodes 21A and 21B, and the LPF 22 based on the instruction from the feeding control section 18, to request the tag IC 27 to transmit the identification data ID.

When the mobile phone 20 is placed on the power feeding unit 10, the power receiving unit 30 is allowed to communicate with the power feeding unit 10. Therefore, the power receiving unit 30 receives the request. Then, the tag IC 27 of the power receiving unit 30 transmits the identification data ID to the power feeding unit 10. On the other hand, when the mobile phone 20 is not placed on the power feeding unit 10, the power receiving unit 30 is not allowed to communicate with the power feeding unit 10. Therefore, the power receiving unit 30 does not respond to the power feeding unit 10.

Next, the power feeding unit 10 determines whether the identification data ID is acquired from the power receiving unit 30 (step S2). Specifically, the feeding control section 18 of the power feeding unit 10 determines whether the reader-writer 16 acquires the identification data ID from the tag IC 27 of the power receiving unit 30 through the power feeding electrodes 11A and 11B, the power receiving electrodes 21A and 21B, and the LPF 22 and then authenticates the power receiving unit 30.

At the step S2, when the power feeding unit 10 acquires the identification data ID and authenticates the power receiving unit 30, the power feeding unit 10 starts the feeding operation to the power receiving unit 30 (step S3). Specifically, the power feeding section 12 of the power feeding unit 10 generates the power signal Sp in response to the instruction from the feeding control section 18, and supplies the power signal Sp to the power receiving section 23 through the power feeding electrodes 11A and 11B and the power receiving electrodes 21A and 21B.

Moreover, at the step S2, when the power feeding unit 10 does not acquire the identification data ID, the power feeding unit 10 stops the feeding operation to the power receiving unit 30 (step S4). In other words, when the power feeding unit 10 does not acquire the identification data ID, the feeding control section 18 determines that the mobile phone 20 is not placed on the power feeding unit 10 or the mobile phone placed on the power feeding unit 10 includes a power receiving unit whose specification is different from that of the feed system 1, and then stops the feeding operation.

Next, the feeding control section 18 waits for a predetermined time (step S5), and then process returns to the step S1. The predetermined time may be set to, for example, about 1 second.

In this way, in the feed system 1, the power feeding unit 10 requests the power receiving unit 30 to transmit the identification data ID at a predetermined time interval. When the power receiving unit 30 responds to the request, the power feeding unit 10 starts or continues the feeding operation, whereas when the power receiving unit 30 does not respond to the request, the power feeding unit 10 stops the feeding operation.

In the feed system 1, the power feeding and the communication are both performed through the power feeding electrodes 11A and 11B and the power receiving electrodes 21A and 21B. Therefore, it is possible to perform the feeding operation efficiently and safely. Specifically, for example, as with the feed system disclosed in Japanese Unexamined Patent Application Publication No. 2012-213322, in the case where the power feeding unit and the power receiving unit are each provided with a magnet as well as the power feeding unit is further provided with a magnetic sensor, and the feeding operation is controlled based on detection results by the magnetic sensor, the feeding operation may not be performed efficiently and safely. Specifically, for example, even in the case where a foreign matter such as a metal is present between the power feeding electrodes and the power receiving electrodes, when a detected value by the magnetic sensor is normal, the feeding operation may be started. If the power feeding is started in such a state, heat may be generated and fire may occur, in addition to lowering in power transmission efficiency. On the other hand, in the feed system 1, the communication is performed through the power feeding electrodes 11A and 11B and the power receiving electrodes 21A and 21B, and the feeding operation is then performed through these electrodes based on communication results. In other words, in the feed system 1, both of the power feeding and the communication are performed through the power feeding electrodes 11A and 11B and the power receiving electrodes 21A and 21B. Accordingly, for example, when a foreign matter such as a metal is present between the power feeding electrodes 11A and 11B and the power receiving electrodes 21A and 21B, the power feeding unit 10 does not start the feeding operation because the communication is impossible. In other words, in such a case, the power feeding unit 10 determines that the communication condition is not met and the feeding condition is also not met accordingly, and thus the power feeding unit 10 does not start the feeding operation. Therefore, the feed system 1 is capable of performing the feeding operation efficiently because unnecessary power feeding is not performed, and is capable of reducing possibility that heat is generated. Consequently, it is possible to perform the feeding operation safely.

In addition, in the feed system 1, an electric field coupling method is employed as a method of performing wireless power feeding. Therefore, it is possible to perform the feeding operation efficiently and safely. Specifically, in the electric field coupling method, a power transmission distance is shorter as compared with the other magnetic field coupling method or the like, and when the distance between the power feeding unit and the power receiving unit is, for example, about several centimeters or larger, transmission efficiency is drastically lowered. Therefore, in the feed system 1, since the power transmission distance is short, the communicable distance between the power feeding unit 10 and the power receiving unit 30 and the feedable distance between the power feeding unit 10 and the power receiving unit 30 are easily coincident with each other. In other words, in the feed system 1, since the power transmission distance is short, when the communication is possible, feedable state is easily secured. Further, in the feed system 1, the amplitude of the power signal Sp is set so that the feedable distance between the power feeding unit 10 and the power receiving unit 30 and the communicable distance between the power feeding unit 10 and the power receiving unit 30 are substantially the same as each other. Therefore, in the feed system 1, since the feeding operation is allowed to be controlled based on the authentication result based on the identification data ID, it is possible to perform the feeding operation efficiently and safely.

Moreover, in the feed system 1, the wireless power feeding is performed by the electric field coupling method as well as both of the power feeding and the communication are performed through the power feeding electrodes 11A and 11B and the power receiving electrodes 21A and 21B. Therefore, in the case where the power receiving unit 30 (the mobile phone 20) is disposed at a proper position on the feeding surface S1 of the power feeding unit 10, authentication is allowed to be performed and the power feeding operation is allowed to be started. Accordingly, it is possible to perform the feeding operation efficiently and safely.

Furthermore, in the feed system 1, when the power receiving unit 30 transmits the data to the power feeding unit 10, the communication is performed through the so-called load modulation. Therefore it is possible to achieve more reliable feeding operation. Specifically, for example, in the case where the load modulation is not performed and the power receiving unit transmits the data to the power feeding unit 10 by receiving power from the battery 24, when a charged amount of the battery 24 is insufficient, the power receiving unit may not transmit the data to the power feeding unit 10. In this case, at the steps S1 and S2 in FIG. 4, the power receiving unit is not allowed to respond to the request from the power feeding unit 10, and the power feeding unit 10 may not feed the power receiving unit with power. On the other hand, in the feed system 1, since the communication is performed through the so-called load modulation, the power receiving unit 30 is allowed to perform the communication irrespective of the charged amount of the battery 24 of the mobile phone 20. Therefore, it is possible to achieve more reliable feeding operation.

Moreover, in the feed system 1, the frequency band of the communication signal is made not be overlapped with the frequency of the power signal Sp. Therefore, it is possible to perform the feeding operation efficiently. Specifically, the frequency of the power signal Sp may be desirably set to, for example, about 100 kHz in terms of power transmission efficiency from the power feeding section 12 to the power receiving section 23. On the other hand, the frequency band of the communication signal may be desirably higher to some extent in terms of data rate. Therefore, the frequency band of the communication signal is set so as not to overlap with the frequency of the power signal Sp, and the communication signal is superimposed with the power signal Sp, which makes it possible to perform the feeding operation and the communication operation at a time. As a result, in the feed system 1, the feeding operation is allowed to be performed efficiently as compared with the case where the feeding operation and the communication operation are performed in a time-divisional manner.

Further, in the feed system 1, the LPF 13 and the HPF 17 are provided in the power feeding unit 10, and the LPF 22 and the HPF 26 are provided in the power receiving unit 30. Therefore, since the power signal and the communication signal are allowed to be separated from each other with use of difference in frequency, it is possible to prevent false operation, breakdown of a circuit, and the like.

Moreover, in the feed system 1, both of the power feeding and the communication are performed through the power feeding electrodes 11A and 11B and the power receiving electrodes 21A and 21B. Therefore, unlike the feed system disclosed in Japanese Unexamined Patent Application Publication No. 2012-213322, it is unnecessary to provide a magnet, a magnetic sensor, and the like. Therefore, it is possible to simplify the configuration.

Furthermore, in the feed system 1, since the power feeding unit 10 authenticates the power receiving unit 30 based on the identification data ID of the tag IC 27, to control the start and stop of the feeding operation, the power feeding unit 10 does not perform the feeding operation on a power receiving unit whose specification is different from that in the feed system 1. Therefore, it is possible to perform the feeding operation safely on the power receiving unit adapted for the specification of the feed system 1.

(Effects)

As described above, in the present embodiment, both of the power feeding and the communication are performed through the power feeding electrodes and the power receiving electrodes. Therefore, it is possible to perform the feeding operation efficiently and safely as well as to simplify the configuration.

Moreover, in the present embodiment, the wireless power feeding is performed by the electric field coupling method. Therefore, it is possible to perform the feeding operation efficiently and safely.

Further, in the present embodiment, when the power receiving unit transmits data to the power feeding unit, the communication is performed through so-called load modulation. Therefore, it is possible to achieve more reliable feeding operation.

Moreover, in the present embodiment, since the frequency band of the communication signal is made not be overlapped with the frequency of the power signal, it is possible to perform the feeding operation efficiently.

Furthermore, in the present embodiment, since the power feeding unit and the power receiving unit are each provided with the LPF and the HPF, it is possible to prevent false operation, breakdown of a circuit, and the like.

Moreover, in the present embodiment, since the power feeding unit controls start and stop of the feeding operation based on the identification data of the tag IC, it is possible to safely perform the feeding operation on the power receiving unit adapted for the specification of the feed system.

(Modification 1)

In the above-described embodiment, the feeding control section 18 of the power feeding unit 10 controls the feeding operation based on the identification data ID supplied from the tag IC 27; however, the configuration is not limited thereto. Alternatively, for example, the tag IC 27 may further transmit the charged amount of the battery 24 to the reader-writer 16, and the feeding control section 18 may control the feeding operation based on the charged amount in addition to the identification data ID. As a result, for example, the power feeding unit 10 is allowed to perform the feeding operation only in a case where the charged amount of the battery 24 is insufficient, and thus the efficient feeding operation is allowed to be performed without performing unnecessary power feeding.

(Modification 2)

In the above-described embodiment, the communication operation is allowed to be performed at the same time when the feeding operation is performed; however, this is not limitative. Alternatively, the feeding operation and the communication operation may be performed in a time-divisional manner. As a result, for example, in the case where noise occurs in the feeding operation, it is possible to reduce possibility that the noise influences the communication operation. In addition, in the case where noise occurs in the communication operation, it is possible to reduce possibility that the noise influences the feeding operation.

(Modification 3)

In the above-described embodiment, the reader-writer 16 and the tag IC 27 exchange the data relating to the feeding operation; however, the data is not limited thereto. For example, the reader-writer 16 and the tag IC 27 may exchange data not relating to the feeding operation. The present modification is described in detail below.

Figure 5:
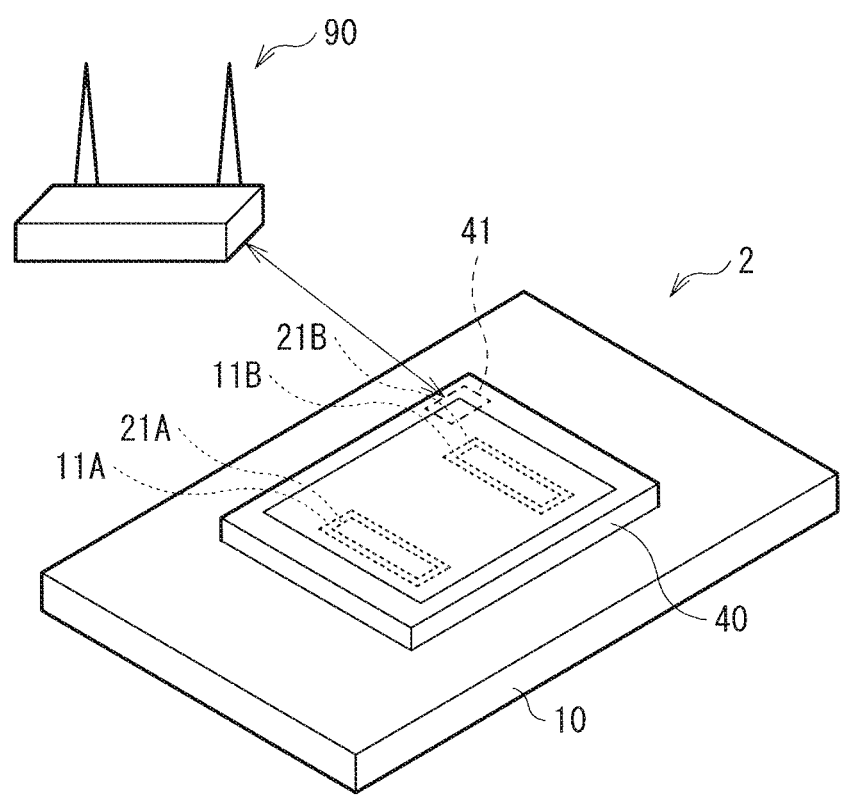
FIG. 5 is a perspective view illustrating a configuration example of a feed system according to a modification.
Figure 6:
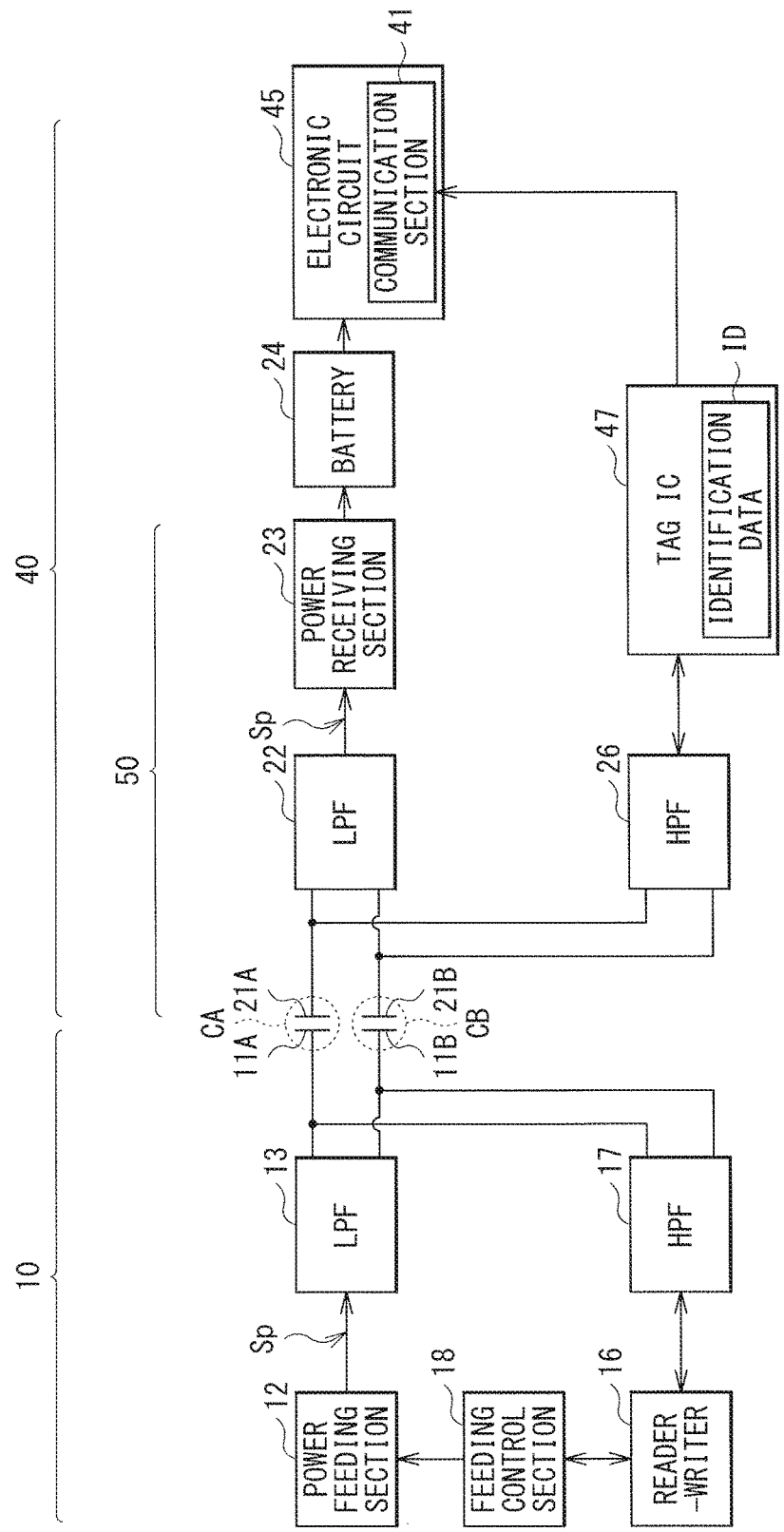
FIG. 6 is a block diagram illustrating a configuration example of a power feeding unit and a mobile phone illustrated in FIG. 5.

FIG. 5 illustrates a configuration example of a feed system 2 according to the present modification. The feed system 2 includes a mobile phone 40 and an access point 90 of wireless local area network (LAN). FIG. 6 illustrates a configuration example of the mobile phone 40.

The mobile phone 40 includes an electronic circuit 45 having a communication section 41, and a power receiving unit 50 having a tag IC 47. The communication section 41 communicates with the access point 90. The tag IC 47 communicates with the reader-writer 16 similarly to the tag IC 27 in the above-described embodiment. At this time, the reader-writer 16 transmits, to the tag IC 47, setting information such as an access point name, an ID, and a password that are used for communication between the access point 90 and the communication section 41, in addition to the data relating to the feeding operation. Then, the tag IC 47 supplies the setting information to the communication section 41. Therefore, the communication section 41 is allowed to communicate with the access point 90.

Such a feed system 2 may be disposed on, for example, commercial facilities such as a convenience store. For example, a user uses the feed system 2 to charge the mobile phone 40 (a smartphone in this example) of the user, and may do shopping until charging completes. The mobile phone 40 may acquire data having a large data quantity such as movie contents from the access point 90 by using the time up to the completion of the charging.

Incidentally, wireless LAN is used in this example; however, this is not limitative. Alternatively, for example, Bluetooth (registered trademark) may be used.

Hereinbefore, although the technology has been described with referring to the embodiment and the modifications, the technology is not limited to the embodiments and the like, and various modifications may be made.

For example, in the above-described embodiment and the like, the power receiving unit 30 and the like are incorporated in the mobile phone. However, this is not limitative, and for example, the power receiving unit 30 and the like may be incorporated in various portable terminal apparatuses such as a digital camera, a video camera, and a mobile battery.

Note that the effects described in the present specification are merely examples without limitation, and other effects may be obtained.

Note that the technology may be configured as follows.

(1) A power feeding unit including:

a power feeding electrode configured to be coupled through an electric field with a power receiving electrode of a power receiving unit;

a power feeding section configured to feed the power receiving unit with power through the power feeding electrode; and a power feeding side communication section configured to communicate with the power receiving unit through the power feeding electrode.

(2) The power feeding unit according to (1), wherein the power feeding side communication section supplies a first signal to the power receiving unit and receives modulation of the first signal modulated by the power receiving unit, as a second signal.

(3) The power feeding unit according to (2), wherein the power feeding section starts or stops the power feeding based on the second signal.

(4) The power feeding unit according to (2) or (3), wherein the second signal is identification data used for identifying the power receiving unit, and the power feeding section authenticates the power receiving unit with use of the identification data.

(5) The power feeding unit according to any one of (2) to (4), wherein the power feeding side communication section intermittently supplies the first signal to the power receiving unit.

(6) The power feeding unit according to any one of (2) to (5), wherein the power feeding section supplies an AC power signal to the power receiving unit to feed the power receiving unit with power, the AC power signal having a frequency excluded from a frequency band used for communication by the power feeding side communication section.

(7) The power feeding unit according to any one of (2) to (6), further including:
a low pass filter interposed between the power feeding section and the power feeding electrode; and
a high pass filter or a band pass filter interposed between the power feeding side communication section and the power feeding electrode.

(8) A power receiving unit including:
a power receiving electrode configured to be coupled through an electric field with a power feeding electrode of a power feeding unit;
a power receiving section configured to receive power from the power feeding unit through the power receiving electrode; and
a power receiving side communication section configured to communicate with the power feeding unit through the power receiving electrode.

(9) The power receiving unit according to (8), wherein the power receiving side communication section modulates a first signal supplied from the power feeding unit.

(10) A feed system including:
a power feeding unit; and
a power receiving unit, wherein
the power feeding unit includes
a power feeding electrode,
a power feeding section configured to feed the power receiving unit with power through the power feeding electrode, and
a power feeding side communication section configured to communicate with the power receiving unit through the power feeding electrode, and
the power receiving unit includes
a power receiving electrode configured to be coupled through an electric field with the power feeding electrode,
a power receiving section configured to receive power from the power feeding unit through the power receiving electrode, and
a power receiving side communication section configured to communicate with the power feeding unit through the power receiving electrode.

(11) The feed system according to (10), further including a communication apparatus, wherein
the power receiving unit includes a communication section communicating with the communication apparatus,
the power receiving side communication section receives setting data from the power feeding side communication section, the setting data being used by the communication section to communicate with the communication apparatus, and
the communication section communicates with the communication apparatus based on the setting data.

It should be understood by those skilled in the art that various modifications, combinations, sub-combinations, and alterations may occur depending on design requirements and other factors insofar as they are within the scope of the appended claims or the equivalents thereof.

What is claimed is:

1. A power feeding unit comprising:
a power feeding section configured to transmit electric power;
a communication section configured to acquire identification data from a power receiving unit after the communication section outputs a request; and
a control section configured to perform an authentication in a manner that determines whether or not the communication section has acquired the identification data,
wherein the control section is configured to control the power feeding section to inhibit the power feeding section from outputting the electric power to the power receiving unit when the control section determines that the communication section has not acquired the identification data.

2. The power feeding unit according to claim 1, wherein the control section is configured to again perform the authentication after waiting for a predetermined time interval.

3. The power feeding unit according to claim 2, wherein the communication section is configured to again output the data request after passage of the predetermined time interval.

4. The power feeding unit according to claim 1, wherein the request is a command for the power receiving unit to output the identification data.

5. The power feeding unit according to claim 1, wherein the control section is configured to again perform the authentication when the communication section has acquired the identification data.

6. The power feeding unit according to claim 1, wherein the control section is configured to again perform the authentication when the communication section has not acquired the identification data.

7. The power feeding unit according to claim 1, wherein the communication section is configured to output the request when the power receiving unit is placed onto the power feeding unit.

8. The power feeding unit according to claim 1, wherein the communication section is configured to again output the data request before the control section again performs the authentication.

9. The power feeding unit according to claim 1, wherein the electric power is a power superimposed with the request.

10. The power feeding unit according to claim 1, wherein the power feeding section is configured to output the electric power when the power receiving unit is placed onto the power feeding unit.

11. The power feeding unit according to claim 1, wherein the power feeding section is controllable by the control section in a manner that the control section permits the power feeding section to output the electric power to the power receiving unit when the control section determines that the communication section has acquired the identification data.

12. The power feeding unit according to claim 1, wherein the communication section is configured to output the data request before the power feeding section outputs the electric power.

13. The power feeding unit according to claim 1, wherein the power feeding section is configured to output the electric power via a first frequency band.

14. The power feeding unit according to claim 13, wherein the communication section is configured to output the data request via a second frequency band.

15. The power feeding unit according to claim 14, wherein the first frequency band is different from the second frequency band.

16. The power feeding unit according to claim 14, wherein the first frequency band does not overlap the second frequency band.

17. The power feeding unit according to claim 14, wherein the power feeding section is between the control section and a low pass filter, the low pass filter is configured to pass the first frequency band while inhibiting passage of the second frequency band.

18. The power feeding unit according to claim 17, wherein the communication section is between the control section and a high pass filter, the high pass filter is configured to pass the second frequency band while inhibiting passage of the first frequency band.

19. The power feeding unit according to claim 18, further comprising:
   an electrode configured to wirelessly output the request and the electric power.

20. The power feeding unit according to claim 19, wherein the electrode is electrically connected directly to the low pass filter and the high pass filter.

21. A power feeding system comprising:
   the power feeding unit according to claim 1; and
   the power receiving unit.

\* \* \* \* \*